United States Patent
Martin et al.

(10) Patent No.: US 10,519,724 B2
(45) Date of Patent: Dec. 31, 2019

(54) TUBULAR CONNECTION WITH SELF-LOCKING THREADING USED IN THE OIL INDUSTRY

(75) Inventors: Pierre Martin, Valenciennes (FR); Eric Verger, Gommegnies (FR)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 2563 days.

(21) Appl. No.: 13/139,522

(22) PCT Filed: Dec. 7, 2009

(86) PCT No.: PCT/EP2009/008711
§ 371 (c)(1),
(2), (4) Date: Aug. 5, 2011

(87) PCT Pub. No.: WO2010/069491
PCT Pub. Date: Jun. 24, 2010

(65) Prior Publication Data
US 2011/0278838 A1    Nov. 17, 2011

(30) Foreign Application Priority Data
Dec. 16, 2008 (FR) ................... 08 07088

(51) Int. Cl.
*F16L 15/06* (2006.01)
*E21B 17/042* (2006.01)
*F16L 15/00* (2006.01)

(52) U.S. Cl.
CPC .......... *E21B 17/042* (2013.01); *F16L 15/001* (2013.01); *F16L 15/06* (2013.01)

(58) Field of Classification Search
CPC ........ F16L 15/06; F16L 15/001; E21B 17/042
(Continued)

(56) References Cited

U.S. PATENT DOCUMENTS

| RE30,647 E | 6/1981 | Blose |
|---|---|---|
| 6,206,436 B1 | 3/2001 | Mallis |

(Continued)

FOREIGN PATENT DOCUMENTS

| EP | 0737287 B1 | 7/1998 |
|---|---|---|
| FR | 2 855 587 | 12/2004 |

OTHER PUBLICATIONS

International Search Report dated Mar. 10, 2010 in PCT/EP09/008711 filed Dec. 7, 2009.
(Continued)

*Primary Examiner* — David Bochna
*Assistant Examiner* — James A Linford
(74) *Attorney, Agent, or Firm* — Oblon, McClelland, Maier & Neustadt, L.L.P.

(57) ABSTRACT

A threaded connection includes first and second tubular components, each including a respective male and female end. The male and female ends each include at least one threaded zone and finish in a terminal surface. The male threaded zone includes a first portion in which a width of teeth, $CWTp$, increases from a value $CWTpmin$ corresponding to a width of a tooth closest to the terminal surface of the male end to a value $CWTpmax$ corresponding to a width of a tooth furthest from the terminal surface. A width of teeth $CWTb$ of the female threaded zone decreases from a value $CWTbmax$ corresponding to a width of a tooth furthest from the terminal surface of the female end to a value $CWTbmin$ corresponding to a width of a tooth closest to the terminal surface. The threaded zones cooperate in accordance with a self-locking make-up, with $CWTpmin/CWTbmax \geq 0.2$ and $CWTbmin/CWTpmax \leq CWTpmin/CWTbmax$.

17 Claims, 6 Drawing Sheets

(58) Field of Classification Search
USPC ........................................ 285/333, 334, 390
See application file for complete search history.

(56) References Cited

U.S. PATENT DOCUMENTS

| | | | |
|---|---|---|---|
| 6,237,967 B1* | 5/2001 | Yamamoto et al. | 285/333 |
| 6,361,083 B1* | 3/2002 | Riesselmann et al. | 285/333 |
| 6,578,880 B2* | 6/2003 | Watts | E21B 17/042 |
| | | | 285/334 |
| 2006/0145480 A1* | 7/2006 | Mallis et al. | 285/390 |
| 2006/0261595 A1 | 11/2006 | Verger et al. | |

OTHER PUBLICATIONS

U.S. Appl. No. 13/510,697, filed May 18, 2012, Martin, et al.
U.S. Appl. No. 13/139,188, filed Jun. 10, 2011, Verger, et al.

* cited by examiner

TUBULAR CONNECTION WITH SELF-LOCKING THREADING USED IN THE OIL INDUSTRY

The present invention relates to a threaded connection with a self-locking threading comprising a first and a second tubular component, one being provided with a tubular male end and the other being provided with a tubular female end, each end being provided with a threaded zone which can cooperate by self-locking tightening up to a locking position when made up one into the other.

In known fashion, it is conventional to connect tubes by make-up, said tubes being intended to constitute a casing or a tubing string in the context of operating a hydrocarbon well. In general, such tubes comprise an end provided with a male threaded zone and an end provided with a female threaded zone each intended to be assembled by make-up with the corresponding end of another component, the assembly defining a connection. The string thus constituted may be rotated when drilling of the well has been carried out horizontally, in order to allow said string to advance towards the bottom of the well or horizontally when it is a horizontally drilled well. For this reason, the components must be made up together with a high torque in order to be able to transmit a rotational torque which is sufficient to allow the string to be advanced into the well and also not to break it out. For conventional products, the make-up torque is generally reached thanks to cooperation by tightening of the abutment surfaces provided on each of the components which are to be made up. However, because the extent of the abutment surfaces is a fraction of the thickness of the tubes, the critical plastication threshold of the abutment surfaces is rapidly reached when too great a make-up torque is applied.

For this reason, developments dedicated, for example, to connections such as those sold by the Applicant under the trade name VAM®HTF were made, in particular as regards the threadings, in order to be able to withdraw from the abutment surfaces at least part or all of the loads which they are not able to accommodate. The aim was achieved using self-locking threadings as described in document FR-2 855 587. In self-locking threadings of that type of connection, as described in the prior art U.S. Re 30 647 and U.S. Re 34 467, the threads (also termed teeth) of the male end and the threads (also termed teeth) of the female end have a constant lead but variable thread widths. More precisely, the widths of the crests of the threads (or teeth) increase progressively for the threads of the male end or female end respectively with increasing distance from the male end or female end respectively. Thus, during make-up, the male and female threads (or teeth) finish by locking into each other in a position corresponding to the locking point. More precisely, locking occurs for self-locking threadings when the flanks of the male threads (or teeth) lock against the flanks of the corresponding female threads (or teeth). When the locking position is reached, the male and female threaded zones which are made up into each other have a plane of symmetry wherein the common mid-height width at the centre of the male and female teeth located at the end of the male threaded zone corresponds to the common mid-height width at the centre of the male and female teeth located at the end of the female threaded zone.

For this reason, the make-up torque is taken by all of the contact surfaces between the flanks, i.e. a total surface area which is very substantially greater than that constituted by the abutment surfaces of the prior art.

However, conventional self-locking threading connections meet with certain limitations in current applications where the tensile/compressive stresses are particularly high. In fact, at the end of the male threaded zone where the widths of the male threads (or teeth) are the lowest, said threads cooperating with the threads (or teeth) of the female end which, in contrast, have large widths. It has been observed that when the connection operates in alternating tension/compression, the flanks of the threads (or teeth) of the end of the male threaded zone are subjected to very high shear stresses, which may cause the male teeth to be torn and respectively, when the connection operates in alternating tension/compression, the flanks of the threads (or teeth) of the end of the female threaded zone are subjected to very high shear stresses which may cause the female teeth to be torn.

In order to overcome those problems, one solution consisting in producing a threading in which the width of the threads (or teeth) of the end of the male threaded zone is larger has been considered and this without changing the total length of the threaded zones. However, that solution involves increasing the lead of the threading. Thus, that solution suffers from the disadvantage of reducing the number of threads, and consequently increasing the risk of jump-out, which corresponds to the male and female threads coming apart when the connection is subjected to large bending or tensile loads. Further, that solution suffers from the disadvantage of reducing the contact surface area in the threads, and consequently reducing the admissible torque in the threading.

Another solution, consisting in increasing the number of threads without changing the total length of the threaded zone, has also been studied. That solution has the advantage of offering a greater total contact surface between the male and female flanks and thus of reducing the loads on each thread. However, that solution involves reducing the variation (also termed the wedge ratio) of the widths of the threads. For this reason, the self-locking characteristic of the threading is attenuated, which means that the locking position of the threading becomes fluctuating taking into account machining inaccuracies. This is particularly problematic if a metal/metal sealing zone is to be provided, wherein two surfaces provided respectively on the male end and on the female end of the tubular components of the connection have to cooperate with an interference fit.

For this reason, the aim of the invention is to reduce the particularly marked disproportion close to the end of the male threaded zone between the width of the teeth of the male and female threaded zones, without modifying either the total length of the threaded zone or the wedge ratio.

More precisely, the invention provides a threaded connection comprising a first and a second tubular component, each being provided with a respective male and female end, the male end comprising, on its external peripheral surface, at least one threaded zone and finishing in a terminal surface which is orientated radially with respect to the axis of the connection, the female end comprising, on its internal peripheral surface, at least one threaded zone and finishing in a terminal surface which is orientated radially with respect to the axis of the connection, the male threaded zone having a first portion in which the width of the teeth, CWTp, increases from a value CWTpmin corresponding to the width of the tooth which is closest to the terminal surface of the male end to a value CWTpmax corresponding to the width of the tooth which is furthest from said terminal surface, while the width of the teeth CWTb of the female threaded zone decreases from a value CWTbmax corresponding to the width of the tooth which is furthest from the terminal surface of the female end to a value CWTpmin corresponding to the width of the tooth which is closest to said terminal surface, such that the threaded zones cooperate in accordance with self-locking make-up, characterized in that:

$$\frac{CWTp\text{min}}{CWTb\text{max}} \geq 0.2$$

AND $$\frac{CWTb\text{min}}{CWTp\text{max}} \leq \frac{CWTp\text{min}}{CWTb\text{max}}$$

Optional complementary or substitutional characteristics of the invention are given below.

The ratio between the width, CWTpmin, of the tooth closest to the terminal surface of the male end and the width, CWTbmax, of the tooth furthest from the terminal surface of the female end is in the range 0.3 to 0.7.

The male threaded zone is composed of a first portion located on the side of the terminal surface, in which the width of the roots CWRp decreases and a second portion located on the side opposite to the terminal surface, in which the width of the roots CWRp remains constant at a value which is greater than or equal to a threshold value CWRpthreshold.

Preferably according to this option, the lead between the male stabbing flanks SFPp is constant in the first portion and gets in the second portion a value equal to that of the lead between the male load flanks LFPp which remains constant in the first and second portions.

Alternatively according to this option, the lead between the male load flanks LFPp is constant in the first portion and gets in the second portion a value equal to that of the lead between the stabbing flanks SFPp which remains constant in the first and second portions.

The male threaded zone is composed of a first portion located on the side of the terminal surface, in which the width of the roots CWRp decreases to a value CWRpthreshold and of a second portion located on the side opposite to the terminal surface in which the width of the roots CWRp increases.

Preferably according to this option, the lead between the male load flanks LFPp is constant in the first portion and gets in the second portion a value LFP'p equal to that of the lead between stabbing flanks in the first portion SFPp. In addition the lead between the male stabbing flanks SFPp is constant in the first portion and gets in the second portion a value SFP'p equal to that of the lead between male load flanks in the first portion LFPp.

The value CWRpthreshold is 0.7 or more times the tooth height.

The male and female threaded zones have a taper generatrix forming an angle with the axis of the connection in the range from 1 degree to 5 degrees.

The teeth of the male and female threaded zones have a dovetail profile.

The crests of the teeth and the roots of the male and female threaded zones are parallel to the axis of the threaded connection.

A clearance h is provided between the crest of the teeth of the male threaded zone and the roots of the female threaded zone.

The male and female ends each respectively comprise a sealing surface which can cooperate with each other in tightening contact when the threaded zones cooperate following self-locking make-up.

The sealing surfaces are respectively constituted by a domed surface on one and by a tapered surface on the other.

The domed surface of one of the sealing surfaces has a generatrix with a radius of curvature in the range 30 to 80 mm.

The tangent of the peak half-angle of the tapered surface of one of the sealing surfaces is in the range 0.025 to 0.075.

The cooperation zone in tightening contact of the sealing surfaces is located between the terminal surface of the male end and the threaded zones.

The characteristics and advantages of the invention are disclosed in more detail in the following description made with reference to the accompanying drawings.

Figure 1:
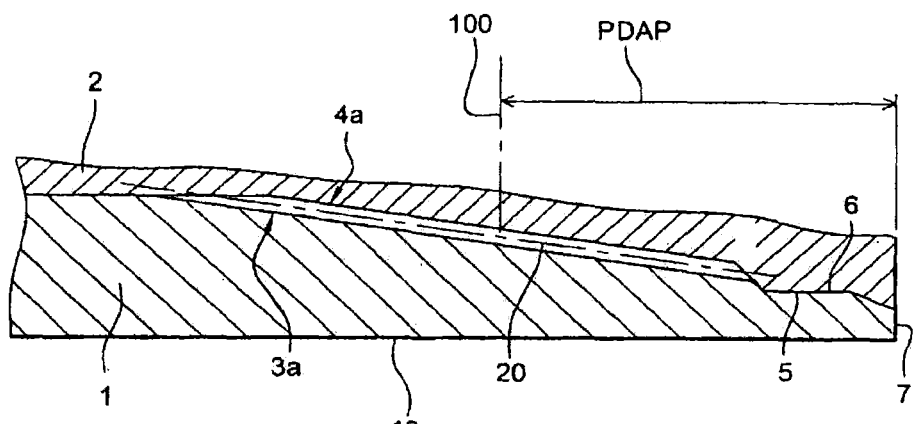
FIG. 1 is a diagrammatic view of a connection comprising a self-locking threading in accordance with the background art.

The background art threaded tubular connection shown in FIG. 1 comprises a tubular element provided with a male end 1 and a tubular element provided with a female end 2, and provided with respective tapered threaded zones 3a, 4a which cooperate together for mutual connection by make-up of the two elements. The threaded zones 3a, 4a are of a known "self-locking" type (also said to have a progressive variation of the axial width of the threads and/or the intervals between the threads) such that a progressive axial tightening is produced during make-up until a final locking position.

Figure 7:
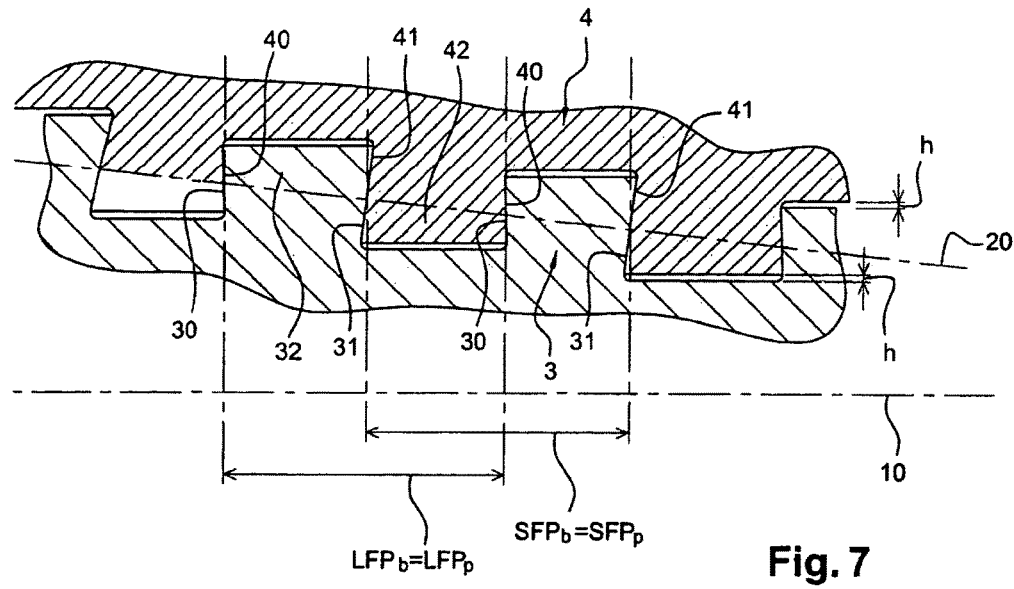
FIG. 7 is a detailed view of two, male and female, threaded zones of a connection of the invention cooperating in self-locking tightening.

FIG. 7 shows in more detail the "self-locking" characteristic of the threaded zones. The term "self-locking threaded zones" means threaded zones comprising the characteristics detailed below. The male threads (or teeth) 32, like the female threads (or teeth) 42, have a constant lead although their width decreases in the direction of their respective terminal surface 7, 8 such that during make-up, the male 32 and female 42 threads (or teeth) finish by locking into each other in a determined position. More precisely, the lead LFPb between the load flanks 40 of the female threaded zone 4 is constant, like the lead SFPb between the stabbing flanks 41 of the female threaded zone, with the feature that the lead between the load flanks 40 is greater than the lead between the stabbing flanks 41. Similarly, the lead SFPp between the male stabbing flanks 31 is constant, like the lead LFPp between the male load flanks 30. Further, the respective leads SFPp and SFPb between the male 31 and female 41 stabbing flanks are equal and smaller than the respective leads LFPp and LFPb between the male 30 and female 40 load flanks, which are themselves equal.

Figure 3:
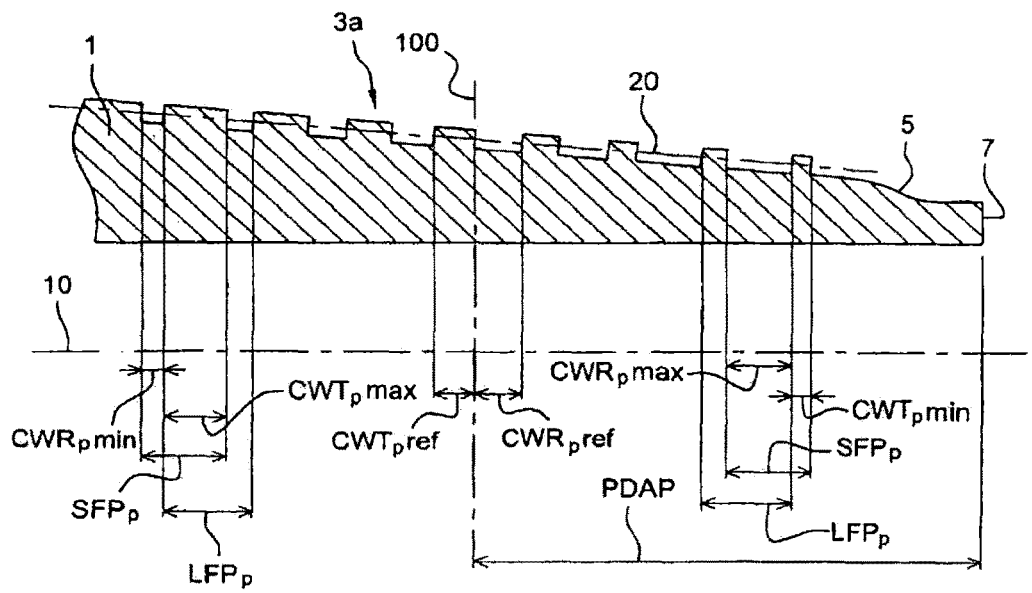
FIG. 3 is a detailed view of a male end of a tubular component of a connection in accordance with the background art.
Figure 4:
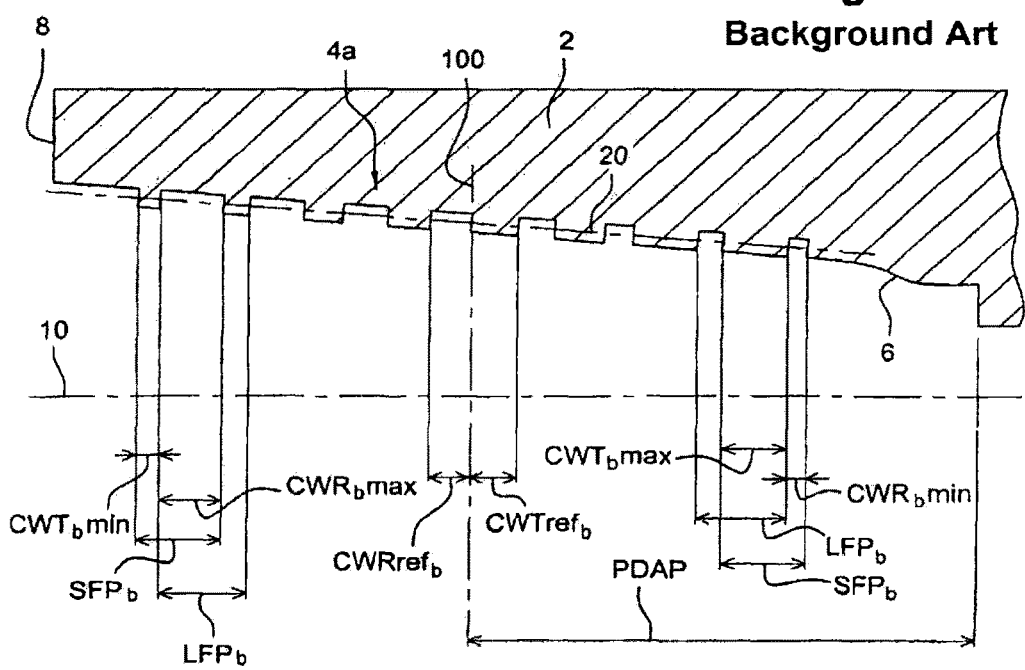
FIG. 4 is a detailed view of a female end of a tubular component of a connection in accordance with the background art.

As can be seen in FIGS. 3 and 4, the threaded zones 3a and 4a of the background art have a plane of symmetry 100 located at a distance PDAP from the terminal surface 7 of the male end. In this plane of symmetry, the width of the male, CWTpref, and female, CWTbref, teeth adjacent to the plane 100 are equal.

As can be seen in FIGS. 3 and 4 which are details of FIG. 1, showing in FIG. 3 a longitudinal sectional view of the male end and in FIG. 4 a longitudinal sectional view of the female end, the width CWTpmin of the tooth (or thread) located closest to the terminal surface 7 of the male end 1 is on the one hand the smallest value of the whole male threaded zone and on the other hand corresponds to the width of the root CWRpmin located furthest from said terminal surface 7.

Similarly, it can be seen that the width CWTbmin of the tooth (or thread) located closest to the terminal surface 8 of the female end is on the one hand the smallest value of the whole female threaded zone and on the other hand corresponds to the width of the root CWRbmin located furthest from said terminal surface 8. Clearly, in order to obtain a radial tightening of the threaded zones, the width CWTpmin of the narrowest tooth of the male threaded zone is equal to the width CWRbmin of the narrowest root of the female threaded zone.

For this reason, it can be seen that the narrowest teeth of the male and female threaded zones are respectively clamped between the corresponding teeth which are the widest. The narrow width of the teeth close to the terminal surface of the male and female ends as well as the large width of the teeth which clamp them may separately or in combination produce a risk of deterioration by shear of these narrow teeth.

It should be noted that the risk of shear is much more critical for the tooth with the minimum width CWTpmin located on the male end 1 than for the tooth with the minimum width CWTbmin located on the female end 2 since the male threaded zone 1 is imperfect close to the male teeth which clamp the minimum width tooth CWTbmin. In fact, near the tooth with a minimum width CWTbmin, the corresponding male teeth are of reduced height to allow a transition to the non-threaded portions and thus run a much lesser risk of causing the corresponding female teeth to be torn.

It should be noted that for a connection resulting from the assembling of a long tubular component carrying the male end with a short tubular component (the latter being termed a coupling) carrying the female end, for the male end the teeth are more imperfect close to the transition with the non-threaded portions. Thus, the risk that the male teeth will clamp the tooth with a minimum width CWTbmin on the female end is smaller still. Thus, the invention is of particular application to connections comprising imperfect threads or teeth cooperating with the minimum width teeth of the female end.

Figure 2:
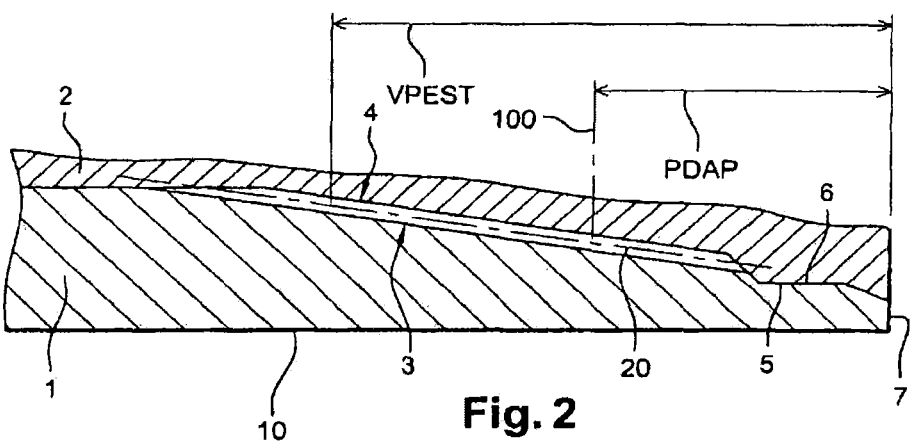
FIG. 2 is a diagrammatic view of a connection comprising a self-locking threading intended for an oil or gas well in accordance with one embodiment of the invention.
Figure 5:
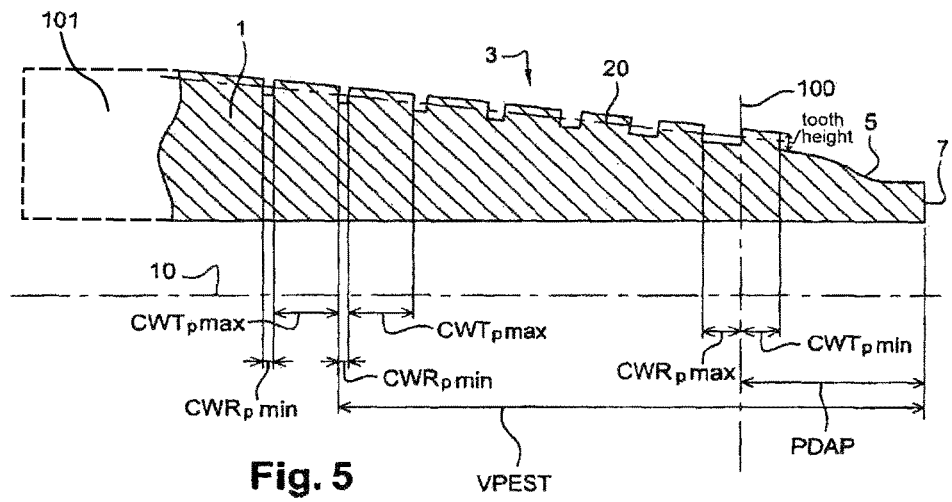
FIG. 5 is a detailed view of a male end of a tubular component of a connection in accordance with the invention.
Figure 6:
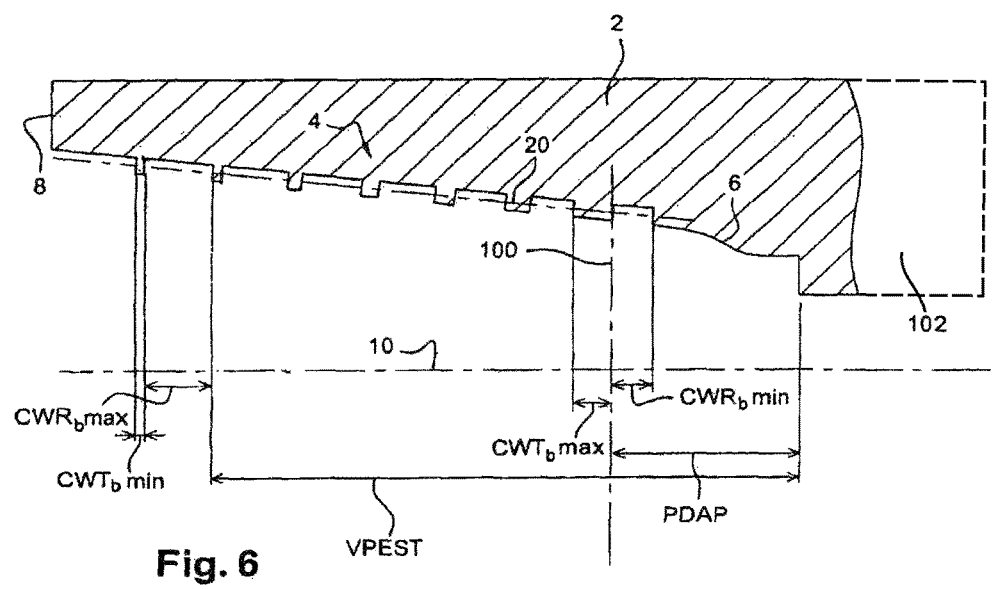
FIG. 6 is a detailed view of a female end of a tubular component of a connection in accordance with the invention.

In order to overcome this problem, our invention described in FIGS. 2, 5 and 6 proposes making a male threaded zone 3 cooperate with a female threaded zone 4 with a length and lead which are identical to those of the background art. The improvement resides in the fact that the ratio between the width, CWTpmin, of the tooth closest to the terminal surface 7 of the male end 1 of tubular component 101 and the width, CWTbmax, of the tooth furthest from the terminal surface 8 of the female end 2 of tubular component 102 is less disproportionate, i.e. more equilibrated. In particular, this ratio is selected to be 0.2 or more. The following equation is obtained:

$$\frac{CWTp\text{min}}{CWTb\text{max}} \geq 0.2$$

Clearly, in terms of resistance to alternating tensile/compressive stresses, in the absolute the ratio between CWTpmin and CWTbmax is better when it approaches 1. This configuration results in drawing the terminal surface 7 of the male end closer to the axis of symmetry 40 of the background art connection by eliminating the portion of the male threaded zone where the teeth are the narrowest. Thus, the width of the tooth closest to the terminal surface 7 is increased by attributing to it a value approaching CWTrefp which corresponds to the width of the tooth adjacent to the axis of symmetry 40 of the background art connection. For this reason, the distance PDAP is reduced, which corresponds to the distance between the axis 100 and the terminal surface 7.

Further, with the aim of conserving the total length of the background art threaded zones in order to maintain the make-up torque, the threaded zone of the end opposite to the terminal surface 7 is likewise extended. For this reason, on the side of the terminal surface 8 of the female end 2, the ratio between the width CWTbmin of the tooth closest to the terminal surface 8 of the female end 2 and the width CWTpmax of the tooth furthest from the terminal surface 7 of the male end 1 tends to reduce. This gives rise to the following inequality:

$$\frac{CWTb\text{min}}{CWTp\text{max}} \leq \frac{CWTp\text{min}}{CWTb\text{max}}$$

It should be noted that accentuating the disproportion between the width CWTbmin of the tooth closest to the terminal surface 8 of the female end 2 and the width CWTpmax of the tooth furthest from the terminal surface 7 of the male end 1 is only slightly prejudicial since the teeth of the male end are termed "imperfect" in this region. In fact, they generally include a chamfer which attenuates the risk of shear for the teeth of the corresponding female end.

Since our invention is based on total lengths derived from those of the background art, it is clear that opposite the terminal surface 7 of the male end 1, the width of the roots is well below the value CWRpmin corresponding to the minimum width of the background art roots. Thus, a problem may arise with machining by conserving a given length of the threaded zone and conserving the value of the lead between the load flanks and between the stabbing flanks. In fact, the width CWRpmin is so small that the cutting tools used break during passage thereof. For this reason, the invention proposes an improvement by modifying the male threaded zone when the width of the roots of the male threaded zone reaches a threshold value CWRpthreshold. This value, CWRpthreshold, is 0.7 or more times the tooth height.

Figure 9:
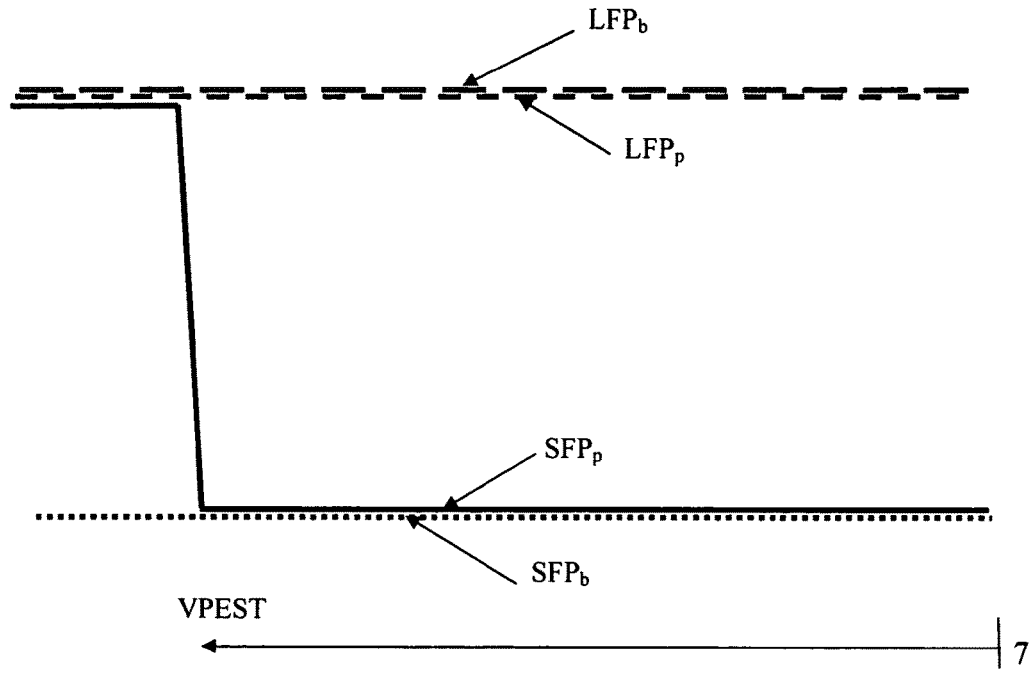
FIG. 9 is a graph showing the evolution of the leads between the load flanks and the stabbing flanks along the threads of the male and female ends in accordance with FIGS. 5 and 6 as a function of the distance from the front surface 7 at the free male end.

In a first variation shown in FIG. 5, when the width of the roots of the male threaded zone reaches a threshold value CWRpthreshold, the male threaded zone adopts a profile which is no longer self-locking but has a constant tooth and root width, respectively equal to CWTpmax and CWRpmin. Thus, from distance VPEST, the value CWRpmin=CWRpthreshold. This transition occurs at a distance VPEST from the terminal zone 7 separating a first portion of the male threaded zone located on the side of the terminal surface 7 from a second portion of the male threaded zone located on the side opposite to the terminal surface 7. Thus, the roots are machined with a constant width CWRpthreshold and the teeth are machined with a constant width LFPp—CWRpthreshold. The lead of the male threaded zone becomes the lead which corresponds to the lead between the load flanks in order to be compatible with the female threaded zone, the self-locking profile of which does not undergo any variation (see FIG. 6). As is shown in the graph of the leads of FIG. 9, in the male threading, the lead between the stabbing flanks SFPp increases suddenly from distance VPEST from the front surface 7 up to a value equal to the lead between the load flanks LFPp which lead remains constant all over the length of the threading. The leads between the load flanks and stabbing flanks of the female threads remain constant all over the length of the female threading. It should thus be noted that contact between the male and the female load flanks is conserved while the contact between the male and female stabbing flanks disappears. However, since this is a portion where the male threads (or teeth) are imperfect, this is little detrimental as regards mechanical strength. It should be noted that the value CWRpthreshold may correspond to an axial space required value for a machining tool of the flanks under which value said machining requires modifications in the tools.

Figure 10:
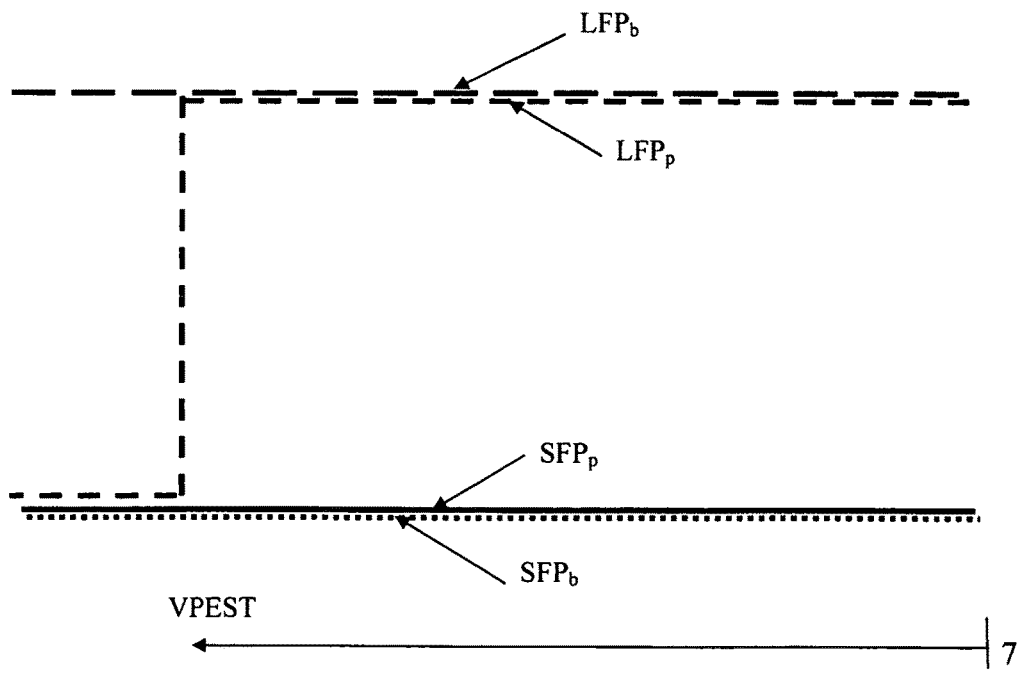
FIGS. 10 to 12 are graphs which are similar to those of FIG. 8 for male ends constituting variations of FIG. 5.

As a sub-variation of this first variation and as shown in the graph of FIG. 10, the lead between male load flanks LFPp reduces suddenly from the distance VPEST from the front surface 7 to a value equal to the lead between the male stabbing flanks SFPp which lead remains constant all over the length of the threading. The leads between the load flanks and the stabbing flanks of the female threads remain constant all over the length of the female threading. As previously the width of the male roots remains constant and equal to CWRpmin. It should be noted that the contact between the male and female stabbing flanks is conserved in this alternative whereas the contact between the male and female load flanks disappears.

Figure 8:
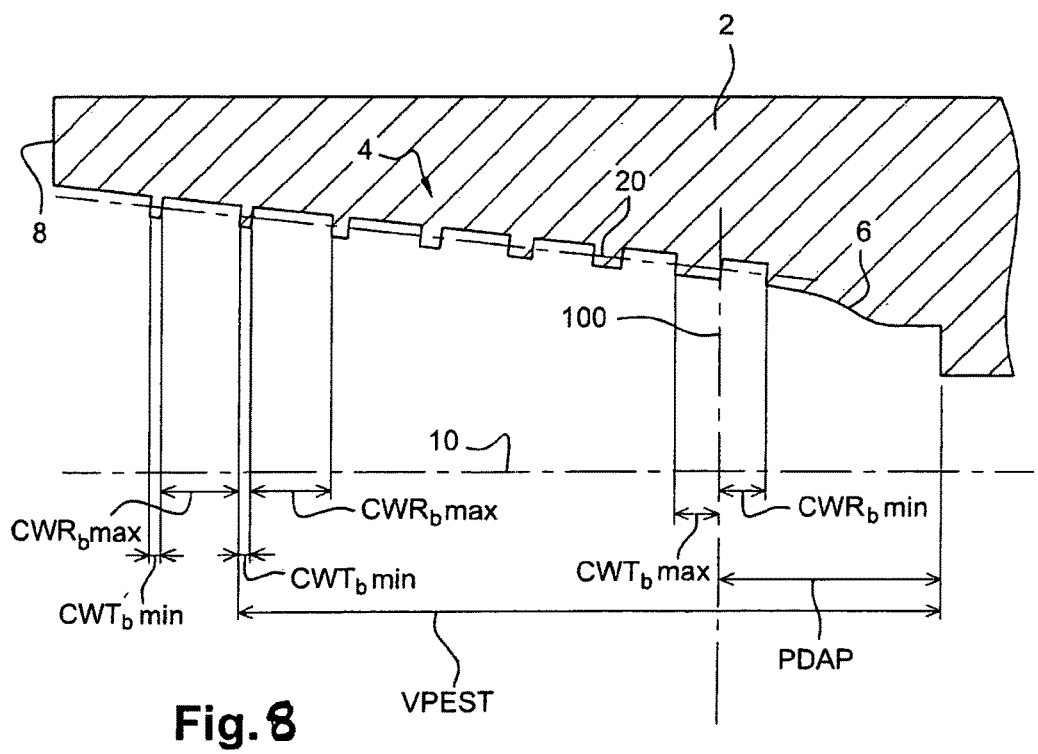
FIG. 8 is a detailed view of a female end along a variation in accordance with the invention.

As another sub-variation of this first variation and as shown in FIG. 8, from distance VPEST, the female threaded zone may also adopt a profile with a teeth width and root width constant and respectively equal to CWTbmin and CWRbmax.

Figure 11:
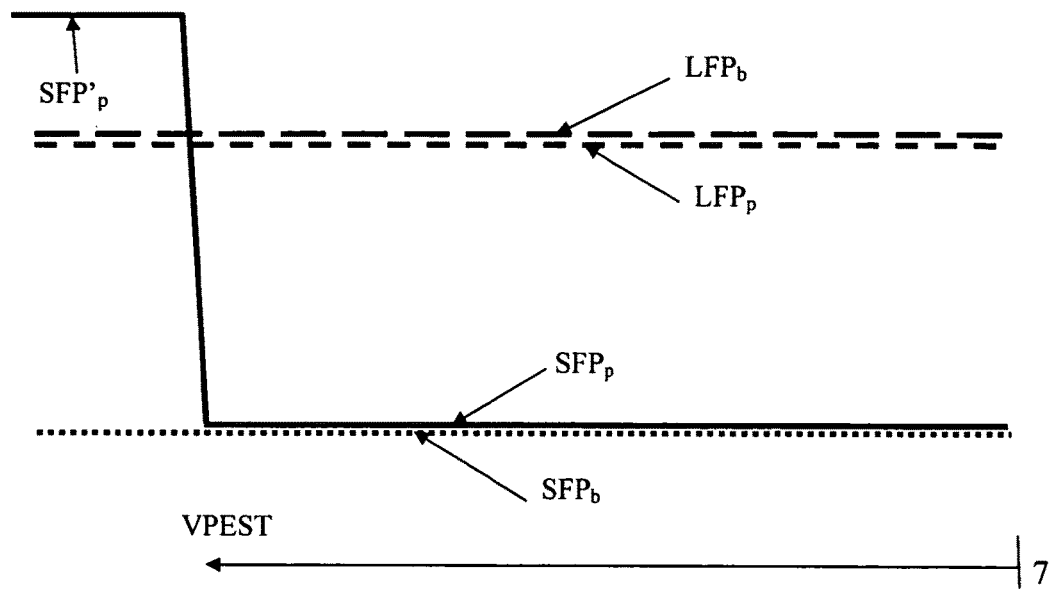

In a second variation, when the width of the roots of the male threaded zone reaches a threshold value CWRpthreshold, the male threaded zone adopts a self-locking profile wherein the width of the roots does not reduce any more but starts to increase while the width of the teeth reduces. This transition occurs at a distance VPEST from the terminal surface 7. The lead between the load flanks of the male threaded zone LFPp does not change. In contrast, the lead between the stabbing flanks of the male threaded zone adopts a raised value SFP'p. More precisely, LFPp is greater than SFPp when the width of the roots of the male threaded zone is greater than CWRpthreshold and LFPp is less than SFP'p when the width of the roots of the male threaded zone is less than CWRpthreshold (see graph of FIG. 11). The skilled person will also know how to select a value SFP'p which is compatible with the female threaded zone which latter does not undergo any variation as regards its own self-locking profile.

Figure 12:
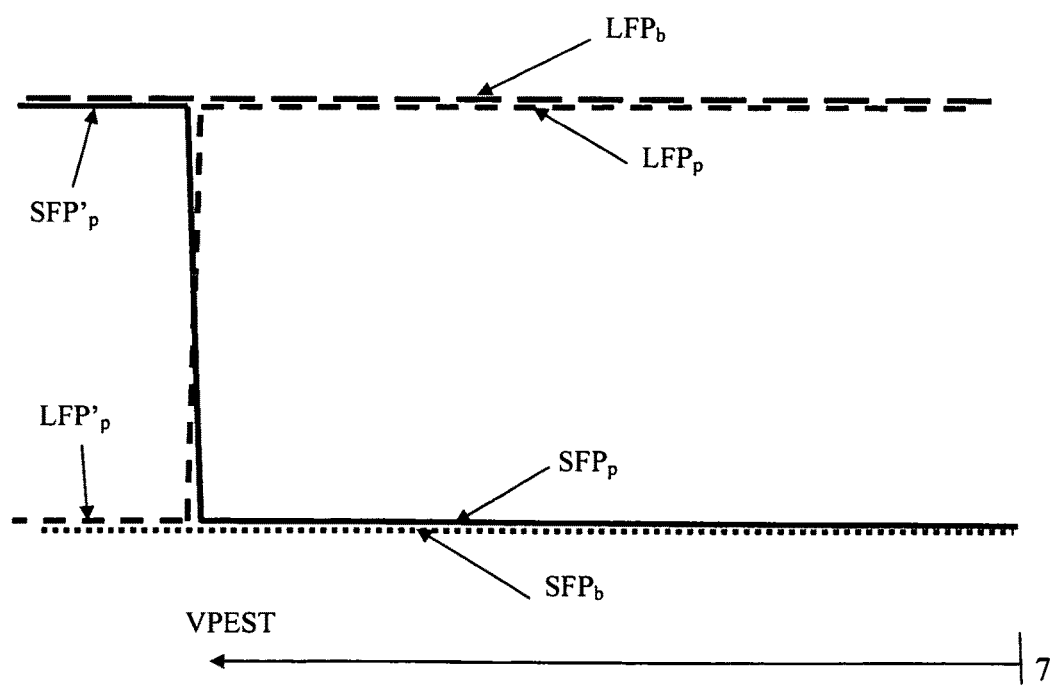

In a third variation shown in graph of FIG. 12, the male threaded zone adopts from distance VPEST to the terminal surface 7 a self-locking profile wherein the width of the teeth roots begin again to increase while the teeth width reduces at a given variation termed a "wedge ratio", which in particular is for example equal to the width of the roots and of the teeth to a distance VPEST of terminal surface 7. The lead between male load flanks LFPp is then suddenly reduced at a distance VPEST and gets a value LFP'p equal to the initial value (i.e. the value to distance VPEST) of the lead between male stabbing flanks SFPp while simultaneously the lead between the male stabbing flanks SFPp is suddenly increased and gets a value SFP'p equal to the initial value (i.e. the value to the distance VPEST) of the lead between load flanks LFPp. In this third variation, the female threading is of the self-locking type without any variation in the lead between flanks all over its axial length. It should be noted as regards this third variation that the contact between male and female load flanks and between male and female stabbing flanks is lost from distance VPEST but this contact loss stands on quite a short length of the threads and at the level of the imperfect male threads, which limits the drawbacks.

Although this leads to minor advantages, the modifications in the lead between the previously presented flanks may be transferred from the male threading to the female threading, the male threading then having no variation in the lead over its axial length or may also be carried out on both the male threading and the female threading.

In order to limit the portion in which the teeth of the male threaded zone 3 no longer fit with radial interference, the skilled person will bear in mind that the distance VPEST must not be reduced by too much. To this end, care would have to be taken not to reduce the distance PDAP by too much. In other words, if a certain length of self-locking threading is to be conserved which enables to guarantee a certain make-up torque value, the ratio CWTpmin/CWTbmax must not be increased by too much, as otherwise it would be necessary to extend the portion of the male threaded zone 3 in which the width of the roots CWRp is subjected to the value CWRpthreshold.

In accordance with an advantageous compromise, the ratio CWTpmin/CWTbmax must be in the range 0.3 to 0.7.

Thus, for a threaded zone with a total length of 117 mm, it is advantageous to place PDAP at a distance of 50 mm from the terminal surface 7 with values for CWTpmin and CWTbmax of 2.7 mm and 5.3 mm, i.e. a ratio of 0.51. The distance at which the profile of the male threaded zone becomes constant is at a distance VPEST of 98 mm. The make-up torque is maintained at 26000 ft lbs (35000 N m).

Advantageously and as shown in FIG. 7, the male and female threads (or teeth) have a dovetail profile such that they are solidly fitted into each other after make-up. This additional guarantee enables to avoid the risk of jump-out, which corresponds to the male and female threads coming apart when the connection is subjected to large bending or tensile stresses. More precisely, the geometry of the dovetail threads increases the radial rigidity of their assembly compared with threads which are usually termed "trapezoidal" threads wherein the axial width reduces from the base to the crest of the threads.

Advantageously and as described in FIG. 7, the threadings 3 and 4 are orientated in a taper generatrix 20 so as to facilitate the progress of make-up. In general, this taper generatrix forms an angle with the axis 10 which is in the range from 1 degree to 5 degrees. The taper generatrix in this case is defined as passing through the centre of the load flanks.

Advantageously and as shown in FIG. 7, contact is principally between the male 30 and female 40 load flanks, like between the male 31 and female 41 stabbing flanks. In contrast, a clearance h may be produced between the male thread crests and the female thread roots, and also a clearance h may be provided between the male thread roots and the female thread crests in order to facilitate the progress of make-up and prevent any risk of galling.

Advantageously and as shown in FIG. 7, the crests of the teeth and the roots of the roots of the male and female threaded zones are parallel to the axis 10 of the threaded connection. This facilitates machining.

Advantageously, the tightness to fluid both to the interior of the tubular connection and to the external medium is provided by two sealing zones 5, 6 located close to the terminal surface 7 of the male element.

The sealing zone 5 may have a domed surface which is facing radially outwardly with a diameter which decreases towards the terminal surface 7. The radius of this domed surface is preferably in the range 30 to 100 mm. Too large a radius (>150 mm) for the domed surface causes problems which are identical to those of cone-on-cone contact. Too small a radius (<30 mm) for this domed surface results in an insufficient contact surface.

Facing this domed surface, the female end 2 has a tapered surface which faces radially inwardly and a diameter of which also decreases in the direction of the terminal surface 7 of the male element. The tangent of the peak half angle of the tapered surface is in the range 0.025 to 0.075, i.e. a taper in the range 5% to 15%. Too small a taper (<5%) for the tapered surface induces a risk of galling on make-up and too high a taper (>15%) necessitates very close tolerances for machining.

The inventors have discovered that such a contact zone between a tapered surface and a domed surface enables to obtain a large effective axial contact width and a substantially parabolic distribution of contact pressures along the effective contact zone, in contrast to contact zones between two tapered surfaces which have narrow effective contact zones at the ends of the contact zone.

A geometry for the contact zone in accordance with the invention enables to conserve a good effective contact width despite variations in the axial positioning of the assembled elements due to machining tolerances, the effective contact zone pivoting along the domed part of the domed surface, conserving a parabolic profile for the local contact pressure.

Advantageously, the load flanks of the thread connect to the thread crest and to the adjacent thread root by roundings such that these roundings reduce the stress concentration factor at the foot of the load flanks and thereby improve the fatigue behaviour of the connection.

The invention claimed is:

1. A threaded connection comprising:
   a first and a second tubular component, each including a respective male and female end,
   the male end comprising, on its external peripheral surface, at least one threaded zone and finishing in a terminal surface which is orientated radially with respect to an axis of the threaded connection, the female end comprising, on its internal peripheral surface, at least one threaded zone and finishing in a terminal surface which is orientated radially with respect to the axis of the threaded connection,
   the male threaded zone comprising a first portion in which a width of teeth, CWTp, increases from a value CWTpmin corresponding to a width of a tooth which is closest to the terminal surface of the male end to a value CWTpmax corresponding to a width of a tooth which is furthest from the terminal surface, while a width of teeth CWTb of the female threaded zone decreases from a value CWTbmax corresponding to a width of a tooth which is furthest from the terminal surface of the female end to a value CWTbmin corresponding to a width of a tooth which is closest to the terminal surface, such that the threaded zones cooperate in accordance with a self-locking make-up, and:

$$\frac{CWTp\text{min}}{CWTb\text{max}} \geq 0.2$$

and $$\frac{CWTb\text{min}}{CWTp\text{max}} \leq \frac{CWTp\text{min}}{CWTb\text{max}}.$$

2. A threaded connection according to claim 1, wherein the ratio between the width, CWTpmin, of the tooth closest to the terminal surface of the male end and the width, CWTbmax, of the tooth furthest from the terminal surface of the female end is in a range 0.3 to 0.7.

3. A threaded connection according to claim 1, wherein the male threaded zone comprises the first portion located on a side of the terminal surface, in which a width of roots CWRp decreases, and a second portion located on a side opposite to the terminal surface, in which the width of the roots CWRp remains constant at a value which is greater than or equal to a threshold value CWRpthreshold.

4. A threaded connection according to claim 3, wherein a lead between male stabbing flanks SFPp is constant in the first portion and gets in the second portion a value equal to a value of a lead between male load flanks LFPp which remains constant in the first and second portions.

5. A threaded connection according to claim 3, wherein a lead between male load flanks LFPp is constant in the first portion and gets in the second portion a value equal to a value of a lead between stabbing flanks SFPp which remains constant in the first and second portions.

6. A threaded connection according to claim 3, wherein the threshold value CWRpthreshold is 0.7 or more times a tooth height.

7. A threaded connection according to claim 1, wherein the male threaded zone comprises the first portion located on a side of the terminal surface, in which a width of roots CWRp decreases to a value CWRpthreshold and a second portion located on a side opposite to the terminal surface in which the width of the roots CWRp increases.

8. A threaded connection according to claim 7, wherein a lead between male load flanks LFPp is constant in the first portion and gets in the second portion a value LFP'p equal to a value of a lead between stabbing flanks in the first portion SFPp and a lead between male stabbing flanks SFPp is constant in the first portion and gets in the second portion a value SFP'p equal to a value of a lead between male load flanks in the first portion LFPp.

9. A threaded connection according to claim 1, wherein the male and female threaded zones comprise a taper generatrix forming an angle with the axis of the threaded connection in a range from 1 degree to 5 degrees.

10. A threaded connection according to claim 1, wherein the teeth of the male and female threaded zones have a dovetail profile.

11. A threaded connection according to claim 1, wherein crests of the teeth and roots of the male and female threaded zones are parallel to the axis of the threaded connection.

12. A threaded connection according to claim 1, wherein a clearance is provided between a crest of the teeth of the male threaded zone and roots of the female threaded zone.

13. A threaded connection according to claim 1, wherein the male and female ends each respectively comprise a sealing surface configured to cooperate with each other in tightening contact when the threaded zones cooperate following the self-locking make-up.

14. A threaded connection according to claim 13, wherein the sealing surfaces respectively comprise a domed surface on one surface and a tapered surface on the other surface.

15. A threaded connection according to claim 14, wherein the domed surface comprises a generatrix with a radius of curvature in a range 30 to 100 mm.

16. A threaded connection according to claim 14, wherein a tangent of a peak half-angle of the tapered surface is in a range 0.025 to 0.075.

17. A threaded connection according to claim 13, wherein a cooperation zone in tightening contact of the sealing surfaces is located between the terminal surface of the male end and the threaded zones.

\* \* \* \* \*

UNITED STATES PATENT AND TRADEMARK OFFICE
CERTIFICATE OF CORRECTION

PATENT NO. : 10,519,724 B2
APPLICATION NO. : 13/139522
DATED : December 31, 2019
INVENTOR(S) : Pierre Martin et al.

It is certified that error appears in the above-identified patent and that said Letters Patent is hereby corrected as shown below:

In the Specification

In Column 2, Line 67, delete "CWTpmin" and insert -- CWTbmin --.

Signed and Sealed this
Ninth Day of June, 2020

Andrei Iancu
*Director of the United States Patent and Trademark Office*